(12) United States Patent
Yu et al.

(10) Patent No.: US 11,811,290 B2
(45) Date of Patent: Nov. 7, 2023

(54) ELECTRIC-MACHINE HOUSING

(71) Applicant: Jing-Jin Electric Technologies Co., Ltd., Beijing (CN)

(72) Inventors: Ping Yu, Beijing (CN); Xinliang Ling, Beijing (CN); Baojiang Li, Beijing (CN); Haibin Wang, Beijing (CN); Minghui Zhang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 391 days.

(21) Appl. No.: 17/027,490

(22) Filed: Sep. 21, 2020

(65) Prior Publication Data
US 2021/0111606 A1    Apr. 15, 2021

(30) Foreign Application Priority Data

Oct. 10, 2019    (CN) ........................ 201910959930.2

(51) Int. Cl.
*H02K 5/20*    (2006.01)
*H02K 5/24*    (2006.01)
*H02K 9/00*    (2006.01)
*H02K 5/04*    (2006.01)

(52) U.S. Cl.
CPC ................ *H02K 5/20* (2013.01); *H02K 5/04* (2013.01); *H02K 5/24* (2013.01); *H02K 9/00* (2013.01)

(58) Field of Classification Search
CPC ........................ H02K 5/20–5/207; H02K 5/24
See application file for complete search history.

(56) References Cited

U.S. PATENT DOCUMENTS 5,448,118 A * 9/1995 Nakamura ............ H02K 5/203
                                              310/58
2020/0195095 A1 * 6/2020 Yoo ........................ B29C 39/40

FOREIGN PATENT DOCUMENTS

| CN | 107104534 A | 8/2017 |
| CN | 107666204 A | 2/2018 |
| CN | 208924037 U | 5/2019 |
| CN | 110581611 A | 12/2019 |
| CN | 110611394 A | 12/2019 |

(Continued)

OTHER PUBLICATIONS

Notice of Reasons for Refusal issued in Japanese Patent Application No. 2020-167031 dated Sep. 7, 2021.

(Continued)

*Primary Examiner* — Ramon M Barrera
(74) *Attorney, Agent, or Firm* — Fox Rothschild LLP; Carol Thorstad-Forsyth

(57) ABSTRACT

The present disclosure discloses an electric-machine housing, which effectively solves the technical problem in the prior art that electric machines have high NVH level. The electric-machine housing is circumferentially provided with a plurality of axial tunnels, and the tunnels are empty or are filled with a damping medium. The structure in which the tunnels are empty or the tunnels are filled with the damping medium can weaken the excitation to the electric-machine housing by the stator vibration, increase the damping coefficient of the electric-machine housing, weaken the transfer paths of vibration and noise, and reduce the amplitude of electromagnetic force waves, thereby inhibiting vibration and noise, to effectively reduce the overall NVH level.

17 Claims, 9 Drawing Sheets

(56) References Cited

FOREIGN PATENT DOCUMENTS

| DE | 102014221492 A1 | 4/2016 |
|----|-----------------|--------|
| EP | 0560993 A1 | 9/1993 |
| EP | 1508194 A1 | 2/2005 |
| JP | H05-103445 A | 4/1993 |
| JP | 2001-211596 A | 8/2001 |
| JP | 2014166031 A | 9/2014 |
| JP | 2017-085740 A | 5/2017 |
| WO | 03100946 A1 | 12/2003 |
| WO | 2013/118703 A1 | 8/2013 |
| WO | 2019/045512 A1 | 3/2019 |

OTHER PUBLICATIONS

European Search Report issued in EP 20197890 dated Feb. 12, 2021.

* cited by examiner

ELECTRIC-MACHINE HOUSING

CROSS-REFERENCE TO RELATED APPLICATIONS

The present application claims priority to Chinese Patent Application No. CN 201910959930.2, filed on Oct. 10, 2019 and entitled "ELECTRIC-MACHINE HOUSING", the content of which is incorporated herein by reference in its entirety.

TECHNICAL FIELD

The present disclosure relates to the technical field of electric machines, and particularly relates to a built-in-damping-type electric-machine housing.

BACKGROUND

Along with the development of the automobile industry, the NVH performance of vehicles has become a comprehensive technical index for quality evaluation of modern car manufacturing. NVH is the abbreviation of Noise, Vibration, Harshness. NVH influences the user experience of the vehicle users most directly and most surfacially. The NVH problem of vehicles is one of the issues that gain the attention of large manufacturing enterprises of entire cars and component parts in the global car industry. Statistical data show that approximately ⅓ of the malfunctions of the entire car is related to the NVH problem of vehicles.

The main energization sources that influence the magnitude of internal car noise include the components such as the engine, the electric motor, the reducer and the tire. Regarding electric vehicles, the main excitation source is from the driving electric motor. A vehicle uses many electric motors, so the study on the noise and vibration of electric motors has become increasingly more important.

SUMMARY

Aiming at the above problems in the prior art, the present disclosure provides an electric-machine housing, which can effectively reduce the NVH level of the electric machine.

To achieve the above object, the technical solutions of the present disclosure are realized as follows:

The present disclosure provides an electric-machine housing, wherein the electric-machine housing is circumferentially provided with a plurality of axial tunnels, and the tunnels are empty or are filled with a damping medium.

Optionally, an N-shaped cooling channel is provided in the electric-machine housing, the cooling channel comprises axial sections and circumferential sections, and the tunnels are located between the axial sections of the cooling channel.

Optionally, a helix cooling channel is provided in the electric-machine housing, and the cooling channel and the tunnels form a double-helix-shaped structure.

Optionally, a liquid or a gas flows in the cooling channel as the cooling medium.

Optionally, cross-sections of the tunnels are approximately triangular, or trapezoidal, or rhombic.

Optionally, inner walls of the tunnels are smooth or uneven.

Optionally, each corner of the triangle, trapezoid or rhombus is chamfered.

Optionally, edges of cross-sections of the tunnels are formed by straight lines and curves.

Optionally, edges of cross-sections of the tunnels are formed by wavy lines.

Optionally, edges of cross-sections of the tunnels are of a shape of teeth, and each of the teeth is T-shaped, or is I-shaped, or has a constant vertical width.

Optionally, a cross-sectional shape of the cooling channel and a cross-sectional shape of the tunnels are complementary, and the cooling channel is provided in spacing between the tunnels.

Optionally, two or more layers of the tunnels are provided in the radial direction of the electric-machine housing.

Optionally, the damping medium is a solid, a paste or a liquid.

Optionally, the electric-machine housing is integrally formed by casting or extrusion, and the tunnels and the cooling channel are formed in the casting or extrusion of the electric-machine housing.

Optionally, the electric-machine housing comprises an inner housing 1.2 and an outer housing, the inner housing 1.2 and the outer housing are separately manufactured and then assembled, the tunnels comprise lower parts and upper parts, the lower parts are located on the inner housing 1.2, the upper parts are located on the outer housing, and the tunnels are completed after the inner housing 1.2 and the outer housing have been assembled.

Optionally, the cooling channel comprises lower parts and upper parts, the lower parts are located on the inner housing 1.2, the upper parts are located on the outer housing, and the cooling channel is completed after the inner housing 1.2 and the outer housing have been assembled.

Optionally, the ends of the electric-machine housing are provided with sealing rings or sealing blocks, to seal the exits of the tunnels.

Optionally, the ends of the electric-machine housing are provided with sealing rings or sealing blocks, and the sealing rings or sealing blocks seal the exits of the tunnels and the cooling channel at the same time.

The present disclosure, by employing the above structure configuration, has the following advantages:

The present disclosure, by using the structure in which the electric-machine housing is provided with the tunnels and the tunnels are empty or filled with the damping medium, can weaken the excitation to the electric-machine housing by the stator vibration, increase the damping coefficient of the electric-machine housing, weaken the transfer paths of the vibration and noise, and reduce the amplitude values of electromagnetic force waves, thereby inhibiting vibration and noise, to improve the comfortableness felt by human.

The present disclosure, when applied to occasions that have high requirements on the vibration and noise of the whole machine (full vehicle) can effectively reduce the overall NVH level.

The present disclosure has a simple and scalable structure, and the length of the housing can be adjusted according to the practical conditions of usage without modifying the mold. The processing process is simple, has a reliable quality and a high efficiency.

Figure 1:
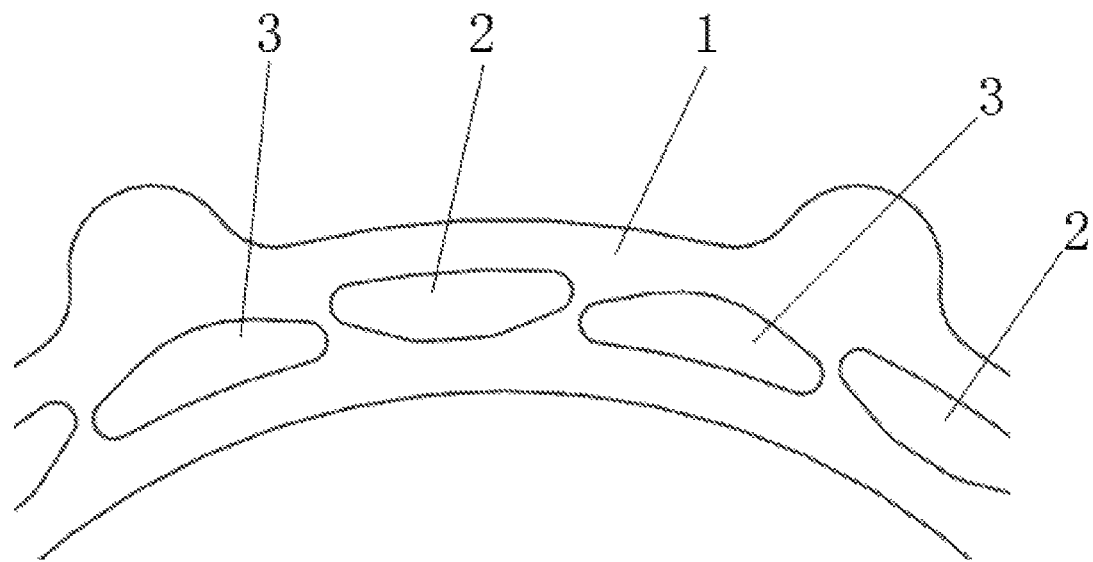
FIG. 1 is a partial sectional view of the electric-machine housing according to the first embodiment of the present disclosure (taken radially)

In the drawings: 1. electric-machine housing; 2. tunnels; 3. cooling channel; 4. water ports; 5. sealing rings; 6. vibration source; and 7. tunnels.

DETAILED DESCRIPTION

Aiming at the defect in the prior art that vehicles have high NVH levels, the present disclosure provides tunnels in an electric-machine housing. The structure in which the tunnels are empty or filled with the damping medium can weaken the excitation to the electric-machine housing by the vibration generated by the stator, increase the damping coefficient of the electric-machine housing, weaken the transfer paths of the vibration and noise, and reduce the amplitude of electromagnetic force waves, to effectively reduce the overall NVH level.

In order to make the objects, the technical solutions and the advantages of the present disclosure clearer, the embodiments of the present disclosure will be described below in further detail in conjunction with the drawings.

The First Embodiment

FIG. 1 shows the first embodiment of the present disclosure. The present embodiment provides an electric-machine housing 1, wherein the electric-machine housing 1 is circumferentially provided with a plurality of axial tunnels 2, and the tunnels 2 are empty or are filled with a damping medium, which forms a built-in-damping-type electric-machine housing.

The inventor has found out by studying that the source of the electromagnetic noise emitted by electric machines is the vibration of the stator, which drives the air around the electric-machine housing to vibrate, to emit noise. The structure of the present embodiment in which the tunnels 2 are empty or filled with the damping medium can increase the damping coefficient of the electric-machine housing, thin the connecting ribs in the electric-machine housing, and weaken the rigid connection.

The filling of the damping medium is performed after the electric-machine housing 1 has been manufactured and formed. The damping medium may be a solid, a paste or a liquid, for example, by using materials such as rubber, silica gel, a lubricating grease and silicone oil. When a solid is employed, for example, a paste is injected into the tunnels 2, and the paste, after being solidified, can be fixedly attached to the electric-machine housing 1.

Figure 8:
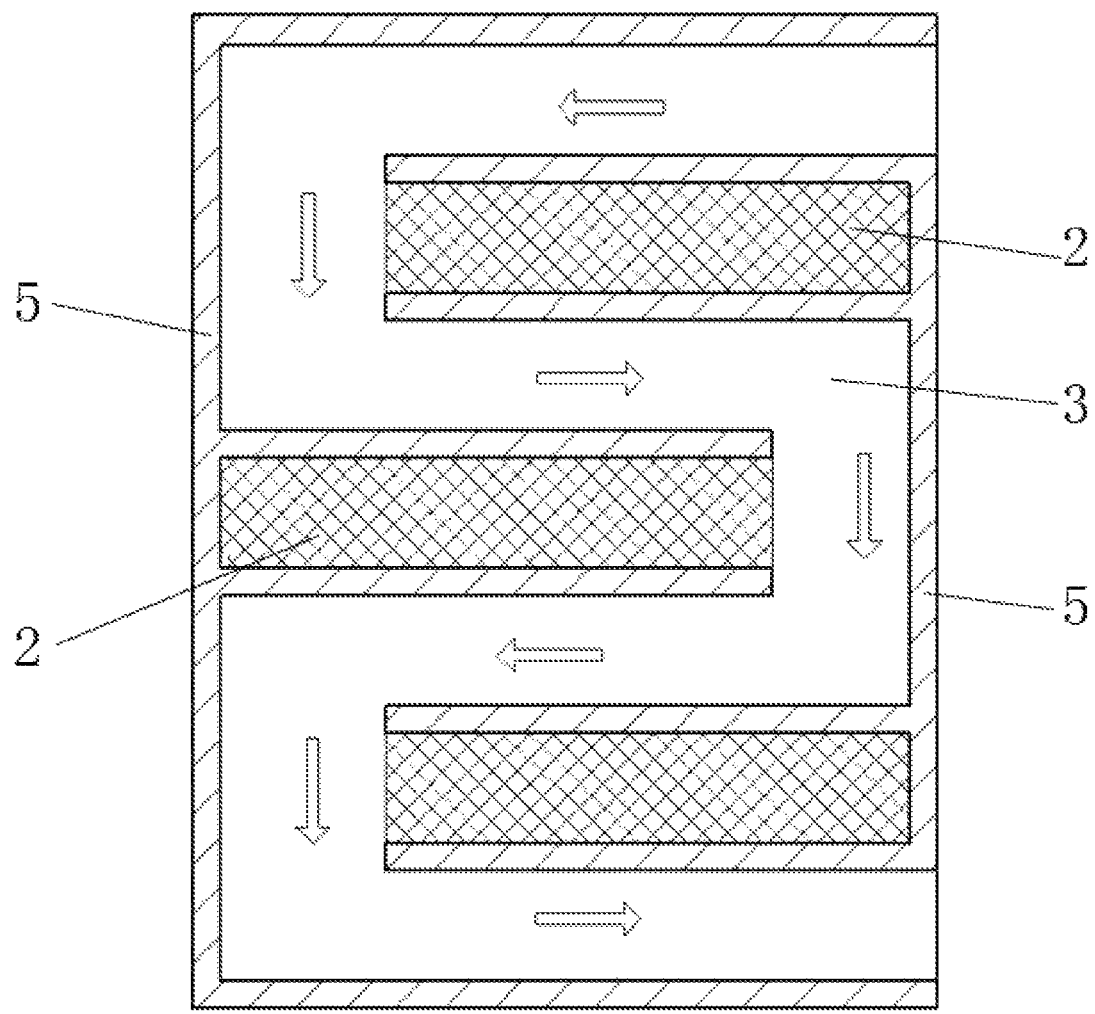
FIG. 8 is a sectional view of the electric-machine housing according to an embodiment of the present disclosure (taken circumferentially)

As shown in FIG. 8, an N-shaped cooling channel 3 is provided in the electric-machine housing 1, the cooling channel 3 comprises axial sections and circumferential sections, and the tunnels 2 are located between the axial sections of the cooling channel 3.

Figure 11:
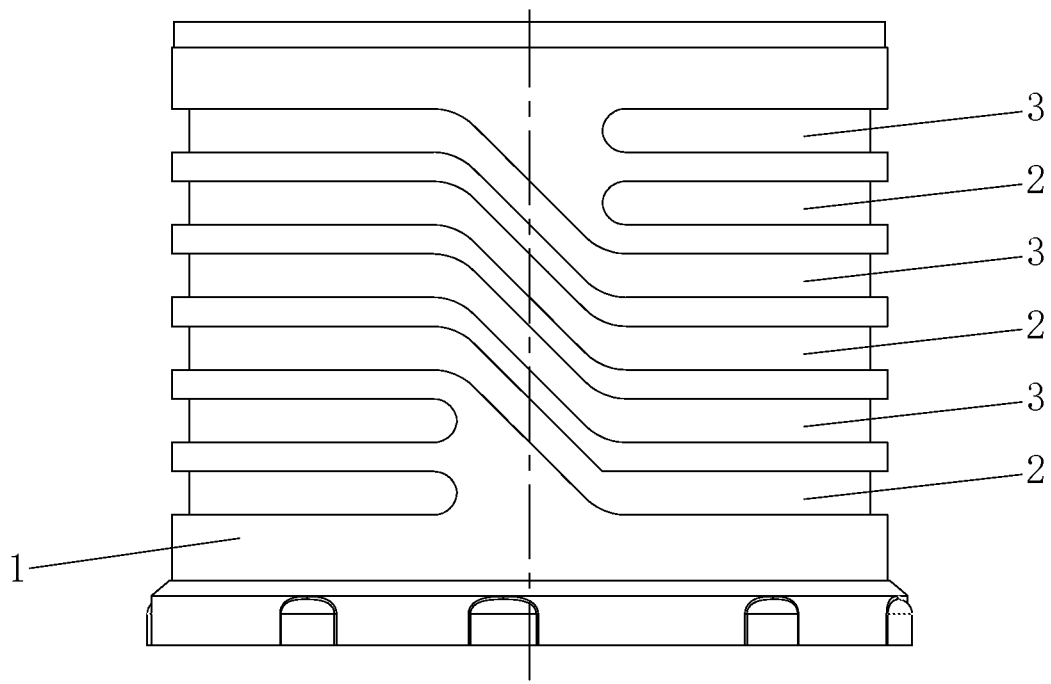
FIG. 11 is a sectional view of the electric-machine housing according to an embodiment of the present disclosure (taken circumferentially)

The cooling channel 3 may also be configured in other structures. For example, as shown in FIG. 11, a helix cooling channel 3 is provided in the electric-machine housing 1, and the cooling channel 3 and the tunnels 2 form a double-helix-shaped structure. The shape of the tunnels 2 and the shape of the cooling channel 3 are the same, and they may be considered as parallelly arranged on the electric-machine housing 1.

A liquid (for example water or oil, or another suitable cooling liquid) or a gas flows in the cooling channel 3, as the cooling medium, to reduce the temperature of the electric machine in operation.

The cross-sections of the tunnels 2 are approximately triangular, or trapezoidal, or rhombic, or may be designed to be another suitable shape, for example rectangular. The inner walls of the tunnels 2 may be designed to be smooth.

Furthermore, each corner of the cross-sections of the tunnels 2 is chamfered, to optimize the structure, and prevent stress concentration to cause cracks.

In the present embodiment, the edges of the cross-sections of the tunnels 2 are formed by straight lines and curves. As shown in FIG. 1, the cross-sections of the tunnels are an approximate isosceles triangle, and after the chamfering, the two equal sides of the isosceles triangle are straight lines, and all of the other parts are arcs.

The cross-sectional shape of the cooling channel 3 and the cross-sectional shape of the tunnels 2 are complementary, and the cooling channel 3 are provided in the spacing between the tunnels 2, whereby the cooling channel 3 and the tunnels 2 can sufficiently occupy the cross-sectional area of the electric-machine housing 1.

The cross-sectional shape of the cooling channel 3 of the present embodiment are also an approximate isosceles triangle. The cross-sectional shape of the cooling channel 3 is positively placed, and the cross-sectional shape of the tunnels 2 is inversely placed, whereby the cooling channel 3 and the tunnels 2 can occupy a relatively large area of the cross-section of the electric-machine housing 1, which sufficiently thins the connecting ribs in the electric-machine housing 1, and weakens the rigid connection.

In the present embodiment, the electric-machine housing 1 is integrally formed by casting or extrusion, and the tunnels 2 and the cooling channel 3 are formed in the casting or extrusion of the electric-machine housing 1.

In order to facilitate the manufacturing, the electric-machine housing 1 may also be manufactured separately. For example, the electric-machine housing 1 comprises an inner housing 1.2 and an outer housing 1.1, the outer housing 1.1 may wrap the inner housing 1.2, the inner housing 1.2 and the outer housing 1.1 are separately manufactured and then assembled, which may also be considered as the inner housing 1.2 being nested by the outer housing 1.1. The tunnels 2 and the cooling channel 3 are also manufactured separately, wherein the tunnels 2 comprise lower parts and upper parts, the lower parts are located on the inner housing 1.2, the upper parts are located on the outer housing 1.1, and the tunnels are completed after the inner housing 1.2 and the outer housing 1.1 have been assembled.

The cooling channel 3 comprise lower parts and upper parts, the lower parts are located on the inner housing 1.2, the upper parts are located on the outer housing 1.1, and the cooling channel are completed after the inner housing 1.2 and the outer housing 1.1 have been assembled.

The inner housing 1.2 and the outer housing 1.1 may be individually formed by extrusion, and then be assembled by welding to form the electric-machine housing 1.

Figure 9:
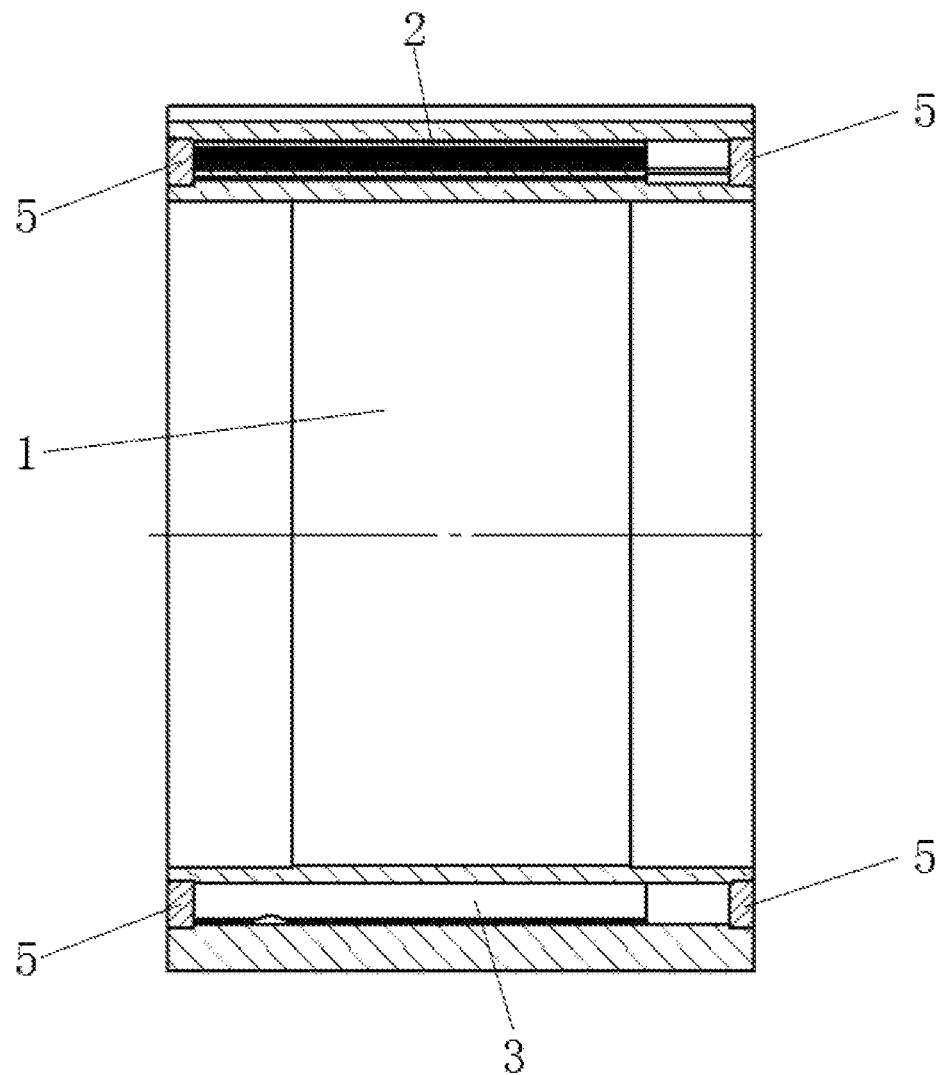
FIG. 9 is a sectional view of the electric-machine housing according to an embodiment of the present disclosure (taken axially)
Figure 10:
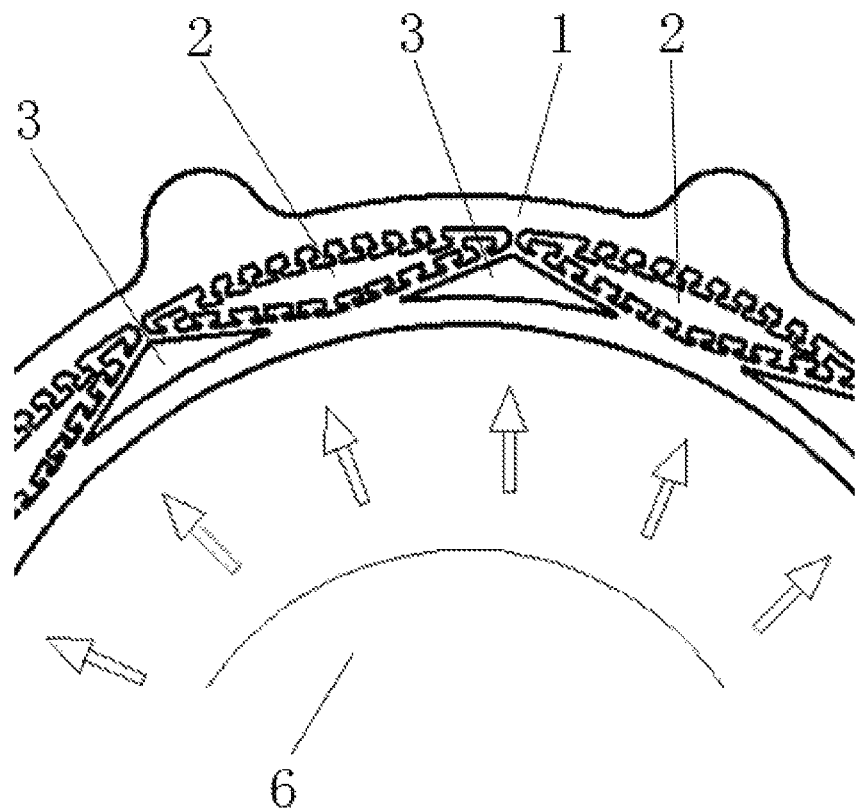
FIG. 10 is a schematic diagram of an operating state of the electric-machine housing according to an embodiment of the present disclosure.

As shown in FIGS. 8 and 9, the ends of the electric-machine housing 1 are provided with sealing rings 5, and the sealing rings 5 seal the openings of the tunnels 2 and also seal the cooling channel 3 at the same time, which guarantees the sealing of the cooling channel 3, and prevents the leakage of the cooling medium.

The ends of the electric-machine housing 1 may also be provided with sealing blocks to seal the openings of the tunnels 2 and the cooling channel 3 at the same time.

The sealing rings 5 or the sealing blocks are made of aluminum, and are fixed to the ends of the electric-machine housing 1 by welding.

By verification by using measured data, the NVH test result of the electric machine of the present embodiment is as follows:

Regarding 48-order radial and axial noises, the effect of denoising is significant: all of the amplitudes of noise reduction at the frequencies of a breathing mode are 3-5 dBA. That enables the electric machine to, in the worst working condition of vibration and noise, have a good NVH performance.

Regarding 96-order radial and axial noises, the amplitudes of noise reduction are commonly 4-13 dBA, which demonstrates a relatively satisfactory effect of denoising.

The inner walls of the electric-machine housing 1 are also provided with components such as stator slots and windings, to form a complete electric-machine stator, which may refer to the prior art, and is not described in detail in the present embodiment.

The tunnels 2 of the present embodiment are located between two sets of water channel, and are designed with the special cross-sectional shapes. The tunnels 2 are empty or the tunnels 2 are filled with the damping medium, which can weaken the excitation to the electric-machine housing by the stator vibration, increase the damping coefficient of the electric-machine housing, weaken the paths of the transmission of vibration and noise, and reduce the amplitude values of electromagnetic force waves, thereby inhibiting vibration and noise, to improve the comfortableness felt by a human.

The Second Embodiment

Figure 2:
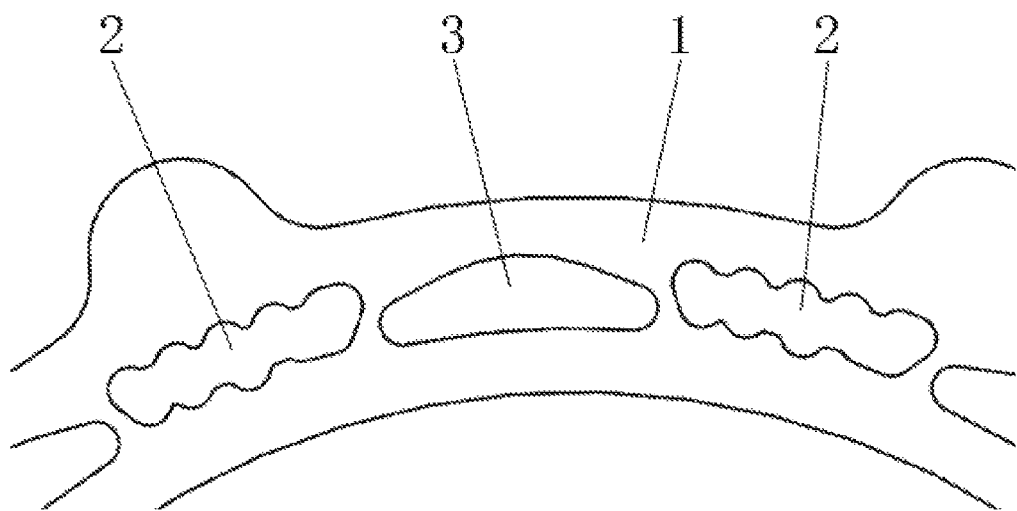
FIG. 2 is a partial sectional view of the electric-machine housing according to the second embodiment of the present disclosure (taken radially)

FIG. 2 shows the second embodiment of the present disclosure. The second embodiment differs from the first embodiment in that: the edges of the cross-sections of the tunnels 2 are formed by wavy lines.

Particularly, the cross-sections of the tunnels 2 shown in FIG. 2 are an approximate isosceles trapezoid, the edge of which is formed by wavy lines. The cross-sections of the cooling channel 3 are still an approximate isosceles triangle.

The above technical means can guarantee the sufficient contact between the damping medium and the electric-machine housing 1, and can also improve the bonding strength between the damping medium and the electric-machine housing 1.

By verification by using measured data, the NVH test result of the electric machine of the present embodiment is as follows:

Regarding 48-order radial and axial noises, the effect of denoising is significant: all of the amplitudes of noise reduction at the frequencies of a breathing mode are 4-5 dBA. That enables the electric machine to, in the worst working condition of vibration and noise, have a good NVH performance.

Regarding 96-order radial and axial noises, the amplitudes of noise reduction are commonly 5-14 dBA, which demonstrates a relatively satisfactory effect of denoising.

The other structures of the electric-machine housing of the second embodiment are the same as those of the first embodiment, and are not described repeatedly here.

The Third Embodiment

Figure 3:
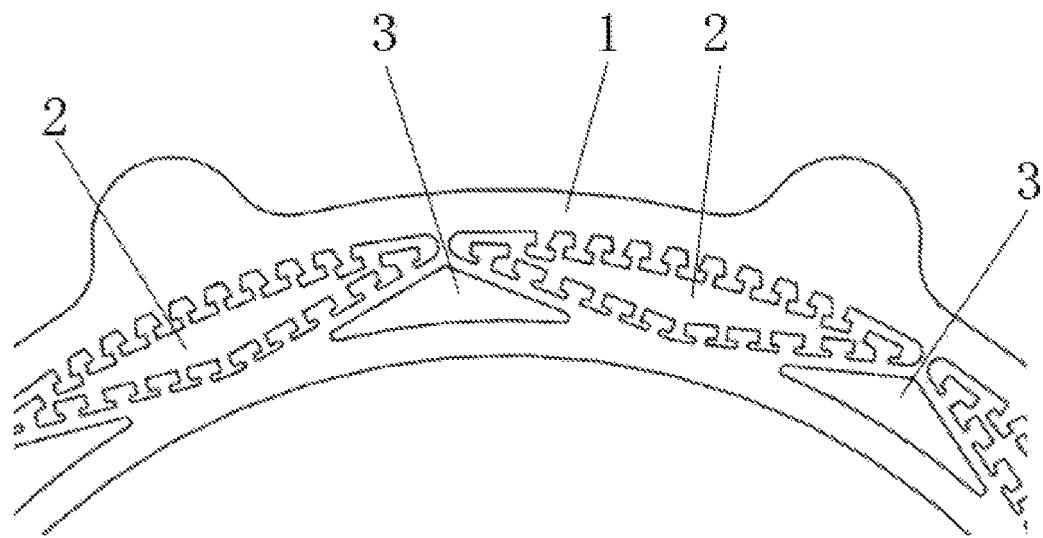
FIG. 3 is a partial sectional view of the electric-machine housing according to the third embodiment of the present disclosure (taken radially)
Figure 4:
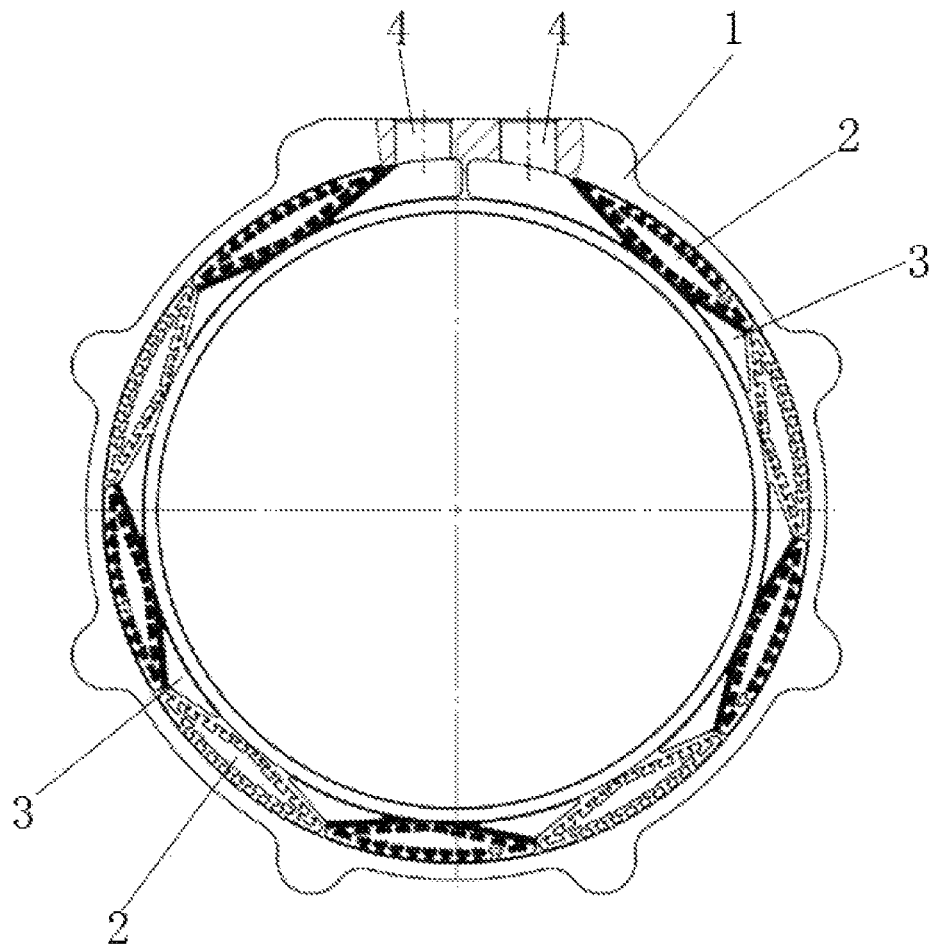
FIG. 4 is a sectional view of the electric-machine housing according to the third embodiment of the present disclosure (taken radially)
Figure 5:
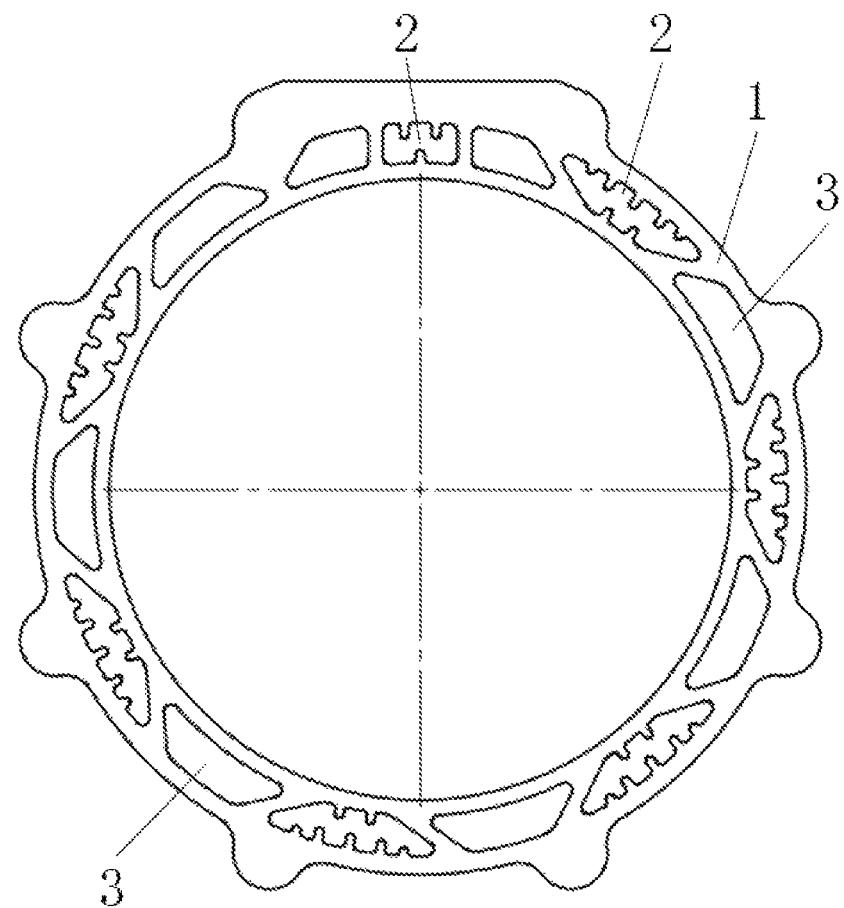
FIG. 5 is a sectional view of the electric-machine housing according to the third embodiment of the present disclosure (taken radially)

FIGS. 3, 4 and 5 show the third embodiment of the present disclosure. The third embodiment differs from the first embodiment in that: the edges of the cross-sections of the tunnels 2 are of a shape of teeth, wherein the teeth in FIGS. 3 and 4 are T-shaped, and the teeth in FIG. 5 are I-shaped, or the teeth have a constant vertical width.

Particularly, the cross-sections of the tunnels 2 shown in FIG. 3 are approximately rhombic, wherein the edges are formed by dentate lines, and the cross-sections of the cooling channel 3 are still an approximate isosceles triangle. The cross-sections of the tunnels 2 shown in FIG. 5 are an approximate isosceles trapezoid, whose edges are formed by dentate lines, and the cross-sections of the cooling channel 3 are still an isosceles trapezoid.

The above technical means can guarantee the sufficient contact between the damping medium and the electric-machine housing 1, and can also improve the bonding strength between the damping medium and the electric-machine housing 1.

By verification by using measured data, the NVH test result of the electric machine of the present embodiment is as follows:

Regarding 48-order radial and axial noises, the effect of denoising is significant: all of the amplitudes of noise reduction at the frequencies of a breathing mode are 6 dBA. That enables the electric machine to, in the worst working condition of vibration and noise, have a better NVH performance.

Regarding 96-order radial and axial noises, the amplitudes of noise reduction are commonly 5-15 dBA, which demonstrates a significant effect of denoising.

It can also be seen in FIG. 4 that the outer housing 1.1 of the electric-machine housing 1 is provided with two water ports 4, which serve as a water inlet and a water outlet. The cooling medium flows into the cooling channel 3 via the water inlet, and flows out of the cooling channel 3 via the water outlet, to realize the circulation of the cooling medium.

The other structures of the electric-machine housing of the third embodiment are the same as those of the first embodiment, and are not described repeatedly here.

The Fourth Embodiment

Figure 6:
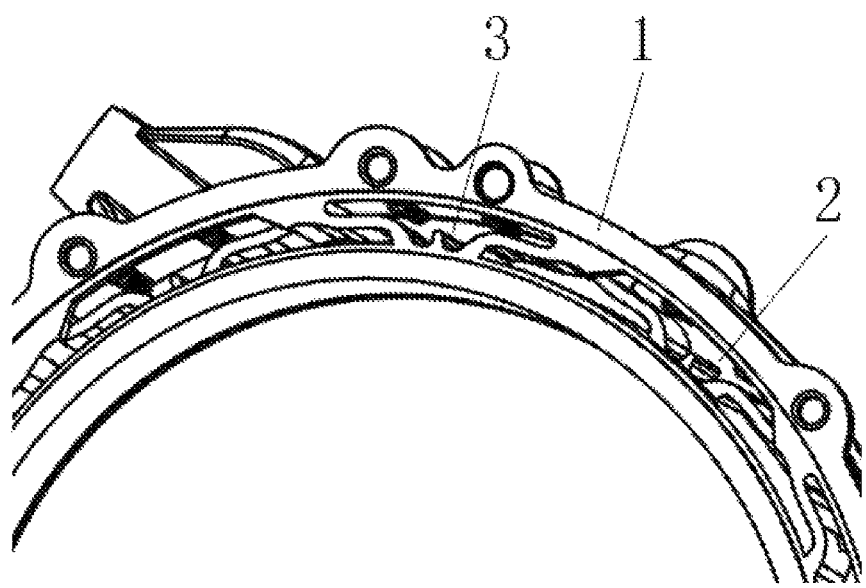
FIG. 6 is a partial sectional view of the electric-machine housing according to the fourth embodiment of the present disclosure (taken radially)
Figure 7:
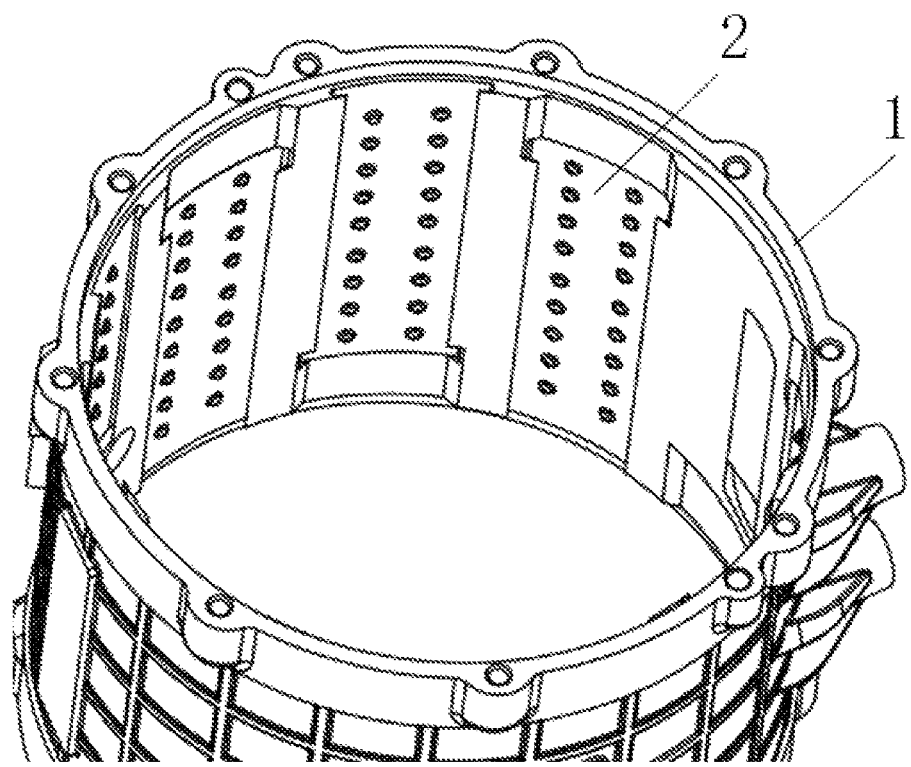
FIG. 7 is a sectional view of the electric-machine housing according to the fourth embodiment of the present disclosure (taken radially)

FIGS. 6 and 7 show the fourth embodiment of the present disclosure. The fourth embodiment differs from the first embodiment in that: the inner walls of the tunnels 2 are uneven. The inner walls of the tunnels 2 may be provided with a plurality of protrusions, and may also be provided with a plurality of grooves.

Particularly, all of the cross-sections of the tunnels 2 and the cross-sections of the cooling channel 3 shown in FIGS. 6 and 7 are of an irregular shape, and the inner walls on the tops of the tunnels 2 are provided with two rows of protrusions.

The above technical means can also improve the bonding strength between the damping medium and the electric-machine housing 1.

By verification by using measured data, the NVH test result of the electric machine of the present embodiment is as follows:

Regarding 48-order radial and axial noises, the effect of denoising is significant: all of the amplitudes of noise reduction at the frequencies of a breathing mode are 4-5 dBA. That enables the electric machine to, in the worst working condition of vibration and noise, have a good NVH performance.

Regarding 96-order radial and axial noises, the amplitudes of noise reduction are commonly 5-14 dBA, which demonstrates a relatively satisfactory effect of denoising.

The other structures of the electric-machine housing of the fourth embodiment are the same as those of the first embodiment, and are not described repeatedly here.

The Fifth Embodiment

The fifth embodiment of the present disclosure is an improvement made on the basis of the first embodiment. The fifth embodiment differs from the first embodiment in that: the electric-machine housing 1 is not provided with a cooling channel 3, but is merely provided with the tunnels 2 therein, and the tunnels 2 are empty or filled with the damping medium.

Because the electric-machine housing 1 is not provided with a cooling channel 3, the whole cross-section of the electric-machine housing 1 may be utilized to provide the tunnels 2, which increases the quantity of the tunnels 2, to further increase the damping coefficient of the electric-machine housing 1.

The adjacent tunnels 2 may be arranged in a complementary mode that one is positively placed and the other is inversely placed. Therefore, the tunnels 2 can occupy a relatively large area of the cross-section of the electric-machine housing 1, which sufficiently thins the connecting ribs in the electric-machine housing 1, and weakens the rigid connection.

The electric machines that implement the present embodiment are required to be cooled by wind cooling.

The other structures of the electric-machine housing of the fifth embodiment are the same as those of the first embodiment, and are not described repeatedly here.

The Sixth Embodiment

Figure 12:
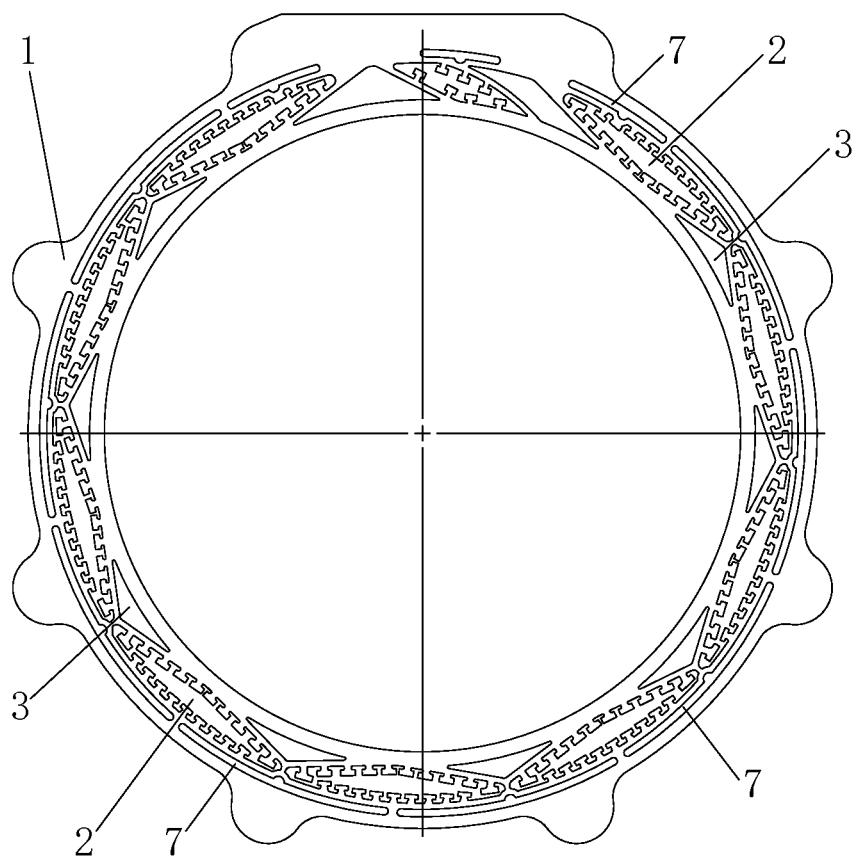
FIG. 12 is a sectional view of the electric-machine housing according to the sixth embodiment of the present disclosure (taken radially).
Figure 13:
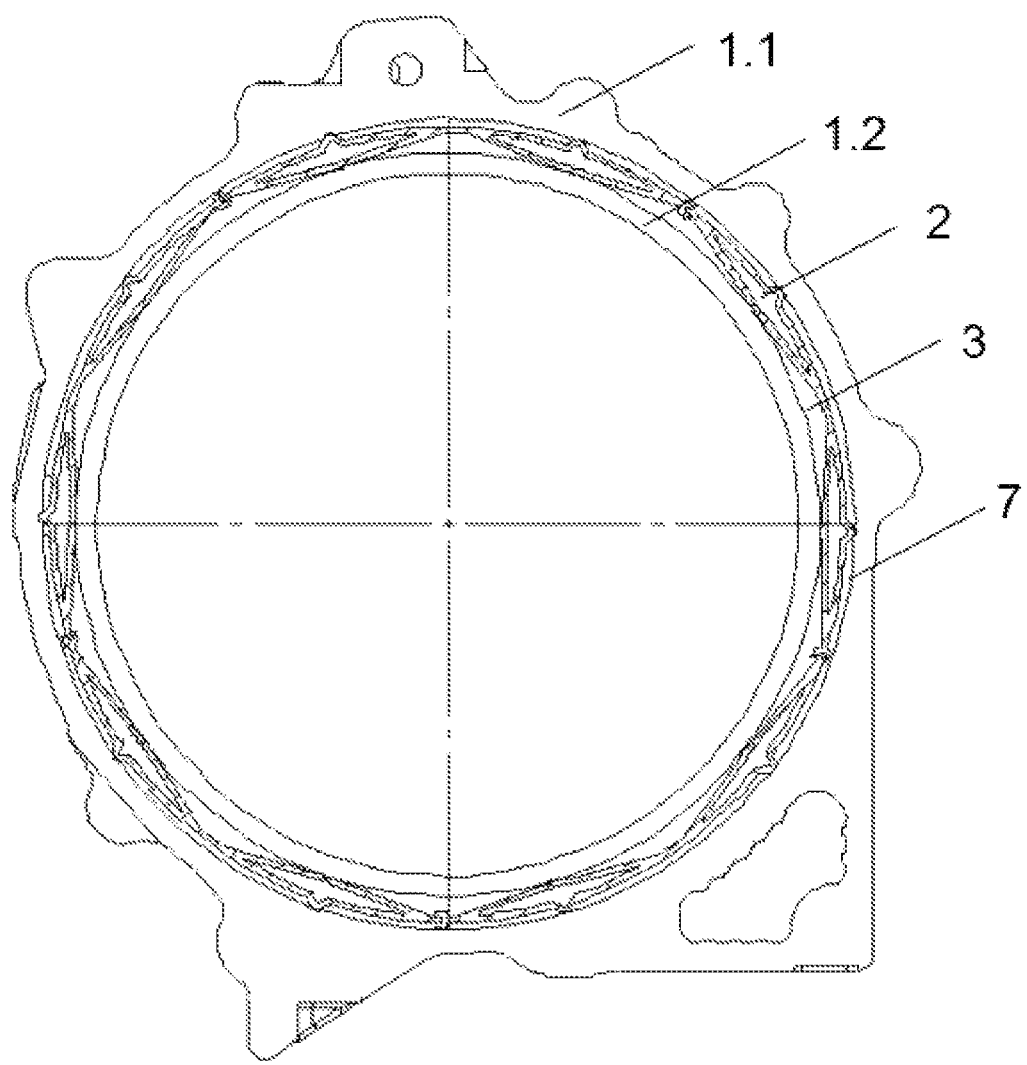
FIG. 13 is an illustration of an electric-machine housing.

The sixth embodiment of the present disclosure is an improvement made on the basis of the first embodiment. As shown in FIG. 12, two layers of the tunnels are provided in the radial direction of the electric-machine housing 1, which are the tunnels 2 of the inner layer and the tunnels 7 of the outer layer, and the tunnels 7 also include a plurality of tunnels, which are not connected to each other, and which are empty or are filled with the damping medium.

The tunnels 7 have a height less than that of the tunnels 2, and can be provided by sufficiently utilizing the remaining solid part of the electric-machine housing 1, which further reduces the solid part of the electric-machine housing 1, and increase the damping coefficient of the electric-machine housing 1.

If allowed by the size of the electric-machine housing 1, more than two layers of the tunnels may also be provided in the radial direction of the electric-machine housing 1, whereby the damping coefficient of the electric-machine housing 1 will be significantly increased.

The other structures of the electric-machine housing of the sixth embodiment are the same as those of the first embodiment, and are not described repeatedly here.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

What is claimed is:

1. An electric-machine housing, wherein the electric-machine housing is circumferentially provided with a plurality of axial tunnels, and the tunnels are empty or are filled with a damping medium,
wherein an N-shaped cooling channel is provided in the electric-machine housing, the cooling channel comprises axial sections and a circumferential section, and the tunnels are located between the axial sections of the cooling channel.

2. The electric-machine housing according to claim 1, wherein a cross-sectional shape of the cooling channel and a cross-sectional shape of the tunnels are complementary, and the cooling channel is provided in spacing between the tunnels.

3. The electric-machine housing according to claim 1, wherein the electric-machine housing is integrally formed by casting or extrusion, and the tunnels and the cooling channel are formed in the casting or extrusion of the electric-machine housing.

4. The electric-machine housing according to claim 1, wherein the electric-machine housing comprises an inner housing and an outer housing, the inner housing and the outer housing are separately manufactured and then assembled, the tunnels comprise lower parts and upper parts, the lower parts are located on the inner housing, the upper parts are located on the outer housing, and the tunnels are completed after the inner housing and the outer housing have been assembled; and the cooling channel comprises lower parts and upper parts, the lower parts are located on the inner housing, the upper parts are located on the outer housing, and the cooling channel is completed after the inner housing and the outer housing have been assembled.

5. The electric-machine housing according to claim 1, wherein two or more layers of the tunnels are provided in a radial direction of the electric-machine housing; and the damping medium is a solid, a paste or a liquid.

6. The electric-machine housing according to claim 1, wherein a helix cooling channel is provided in the electric-machine housing, and the helix cooling channel and the tunnels form a double-helix-shaped structure.

7. The electric-machine housing according to claim 6, wherein a cross-sectional shape of the helix cooling channel and a cross-sectional shape of the tunnels are complementary, and the helix cooling channel is provided in spacing between the tunnels.

8. The electric-machine housing according to claim 6, wherein two or more layers of the tunnels are provided in a radial direction of the electric-machine housing; and the damping medium is a solid, a paste or a liquid.

9. The electric-machine housing according to claim 6, wherein the electric-machine housing is integrally formed by casting or extrusion, and the tunnels and the helix cooling channel are formed in the casting or extrusion of the electric-machine housing.

10. The electric-machine housing according to claim 6, wherein the electric-machine housing comprises an inner housing and an outer housing, the inner housing and the outer housing are separately manufactured and then assembled, the tunnels comprise lower parts and upper parts, the lower parts are located on the inner housing, the upper parts are located on the outer housing, and the tunnels are completed after the inner housing and the outer housing have been assembled; and the cooling channel comprises lower parts and upper parts, the lower parts are located on the inner housing, the upper parts are located on the outer housing, and the cooling channel is completed after the inner housing and the outer housing have been assembled.

11. The electric-machine housing according to claim 1, wherein cross-sections of the tunnels are approximately triangular, or trapezoidal, or rhombic; and inner walls of the tunnels are smooth or uneven.

12. The electric-machine housing according to claim 11, wherein two or more layers of the tunnels are provided in a radial direction of the electric-machine housing; and the damping medium is a solid, a paste or a liquid.

13. The electric-machine housing according to claim 1, wherein edges of cross-sections of the tunnels are formed by straight lines and curves;

or, edges of cross-sections of the tunnels are formed by wavy lines.

14. The electric-machine housing according to claim 13, wherein two or more layers of the tunnels are provided in a radial direction of the electric-machine housing; and the damping medium is a solid, a paste or a liquid.

15. The electric-machine housing according to claim 1, wherein edges of cross-sections of the tunnels are of a shape of teeth, and each of the teeth is T-shaped, or is I-shaped, or has a constant vertical width.

16. The electric-machine housing according to claim 15, wherein two or more layers of the tunnels are provided in a radial direction of the electric-machine housing; and the damping medium is a solid, a paste or a liquid.

17. The electric-machine housing according to claim 1, wherein two or more layers of the tunnels are provided in a radial direction of the electric-machine housing; and the damping medium is a solid, a paste or a liquid.

* * * * *